(12) United States Patent
Steinmetz et al.

(10) Patent No.: US 6,285,942 B1
(45) Date of Patent: Sep. 4, 2001

(54) FLOW-BASED ON-COMING CLUTCH FILL CONTROL FOR AN AUTOMATIC TRANSMISSION

(75) Inventors: Todd M Steinmetz, Indianapolis; Jeffrey Kurt Runde, Fishers; Gregory A Hubbard, Carmel; Phillip F McCauley, Zionsville; Charles Francis Long, Pittsboro; Martin Robert Dadel, Indianapolis, all of IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/531,848

(22) Filed: Mar. 20, 2000

(51) Int. Cl.[7] .......................... G06F 17/00; G06F 19/00; G06F 7/00
(52) U.S. Cl. .......................... 701/67; 701/51; 701/66; 477/152; 477/155; 192/109 F
(58) Field of Search .................................. 701/51, 52, 66, 701/67; 340/606; 477/116, 39, 152, 155; 192/87.13, 109 F; 60/431, 452

(56) References Cited

U.S. PATENT DOCUMENTS

| | | | | |
|---|---|---|---|---|
| 4,942,787 | * | 7/1990 | Aoki et al. | 477/152 |
| 5,174,114 | * | 12/1992 | Aoyagi | 91/446 |
| 5,247,858 | * | 9/1993 | Niiyama | 477/116 |

* cited by examiner

Primary Examiner—William A. Cuchlinski, Jr.
Assistant Examiner—Gertrude Arthur
(74) Attorney, Agent, or Firm—Laura C. Hargitt

(57) ABSTRACT

An improved shift control for a hydraulic automatic transmission in which the apply chamber of an on-coming clutch is filled in the preparation phase of the shift using a hydraulic flow rate model to estimate the volume of hydraulic fluid supplied to the apply chamber. In an initial portion of the fill interval, fluid is supplied to the apply chamber at a first elevated pressure, while continuously updating the fluid volume estimate. When the remaining un-filled volume of the apply chamber reaches a reference volume, the supply pressure is reduced to a second pressure at which the next phase of the shift is to be carried out. When the chamber volume is filled, the torque capacity of the clutch rises to a level corresponding to the second pressure, and the next phase of the shift automatically ensues.

6 Claims, 3 Drawing Sheets

| RANGE \ CLUTCH | C1 | C2 | C3 | C4 | C5 |
|---|---|---|---|---|---|
| 1st | X | | | | X |
| 2nd | X | | | X | |
| 3rd | X | | X | | |
| 4th | X | X | | | |
| 5th | | X | X | | |
| 6th | | X | | X | |
| R | | | X | | X |
| N | | | | | X |

FLOW-BASED ON-COMING CLUTCH FILL CONTROL FOR AN AUTOMATIC TRANSMISSION

TECHNICAL FIELD

This invention relates to a shift control for an automatic transmission, and more particularly to a fill control for an on-coming clutch.

BACKGROUND OF THE INVENTION

In general, a motor vehicle automatic transmission includes a number of gear elements and selectively engageable friction elements (referred to herein as clutches) that are controlled to establish one of several forward speed ratios between the transmission input and output shafts. The input shaft is coupled to the vehicle engine through a fluid coupling such as a torque converter, and the output shaft is coupled to the vehicle drive wheels through a differential gearset.

Shifting from a currently established speed ratio to new speed ratio involves, in most cases, disengaging a clutch (off-going clutch) associated with the current speed ratio and engaging a clutch (on-coming clutch) associated with the new speed ratio. Each such shift includes a fill or preparation phase during which an apply chamber of the on-coming clutch is filled in preparation for torque transmission. Once filled, the on-coming clutch transmits torque in relation to the clutch pressure, and the shift can be completed using various control strategies.

Typically, the fill phase is carried out by commanding a maximum on-coming clutch pressure for an empirically determined fill time. See, for example, the U.S. Pat. No. 4,707,789 to Downs et al., issued on Nov. 17, 1987, and assigned to the assignee of the present invention. In Downs et al., the fill time for any given clutch is obtained from a look-up table as a function of the commanded fill pressure, less the clutch return spring pressure, and then adjusted as a function of fluid temperature to compensate for variations in fluid viscosity. In operation, the stored fill times are then adaptively adjusted based on the observed inertia phase delay, in order to compensate for sources of error that influence the fill time. A similar approach is found in the U.S. Pat. No. 5,216,606 to Lentz et al., issued on Jun. 1, 1993, and assigned to the assignee of the present invention. In Lentz et al., the fill time is determined by table look-up based on the pump speed, as compensated for efficiency and fluid viscosity, and further modified based on the time since the last shift and a hydraulic restriction factor.

SUMMARY OF THE INVENTION

The present invention is directed to an improved shift control for a hydraulic automatic transmission in which the apply chamber of an on-coming clutch is filled in the preparation phase of the shift using a hydraulic flow rate model to estimate the volume of hydraulic fluid supplied to the apply chamber. In an initial portion of the fill interval, fluid is supplied to the apply chamber at a first elevated pressure, while continuously updating the fluid volume estimate. When the remaining un-filled volume of the apply chamber reaches a reference volume, the supply pressure is reduced to a second pressure at which the next phase of the shift is to be carried out. When the chamber volume is filled, the torque capacity of the clutch rises to a level corresponding to the second pressure, and the next phase of the shift automatically ensues.

DESCRIPTION OF THE PREFERRED EMBODIMENT

The control of this invention is described in the context of a multi-ratio power transmission having a planetary gearset of the type described in the U.S. Pat. No. 4,070,927 to Polak, and having an electro-hydraulic control of the type described in U.S. Pat. No. 5,601,506 to Long et al. Accordingly, the gearset and control elements shown in FIG. 1 hereof have been greatly simplified, it being understood that further information regarding the fluid pressure routings and so on may be found in the aforementioned patents.

Figures 1, 2:
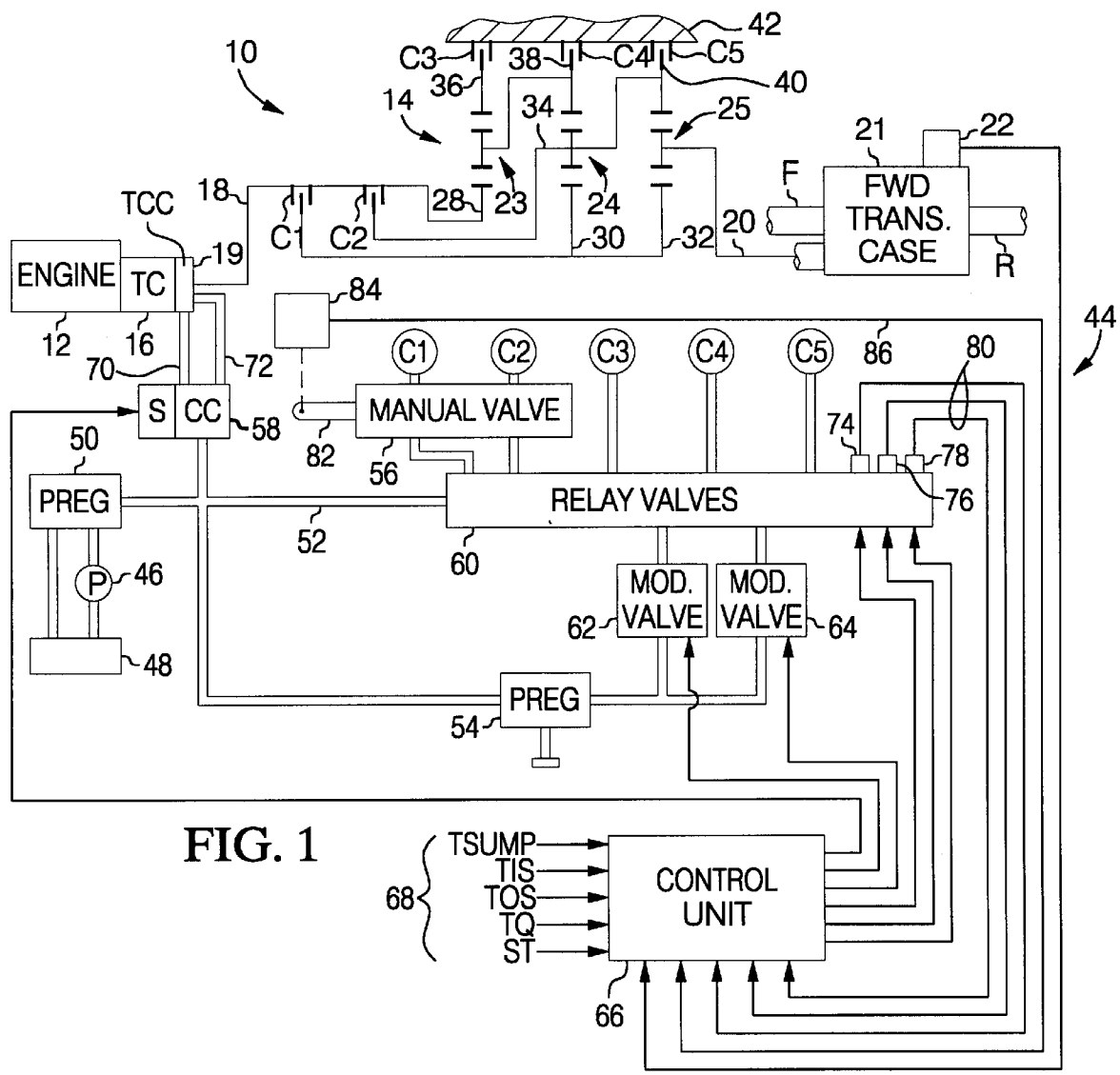
FIG. 1 is a diagram of an automatic transmission and microprocessor-based control unit for carrying out the control of this invention.
FIG. 2 is a table indicating a relationship between transmission clutch activation and corresponding speed ratio.

Referring to FIG. 1, the reference numeral 10 generally designates a vehicle powertrain including engine 12, transmission 14, and a torque converter 16 providing a fluid coupling between engine 12 and transmission input shaft 18. A torque converter clutch 19 is selectively engaged under certain conditions to provide a mechanical coupling between engine 12 and transmission input shaft 18. The transmission output shaft 20 is coupled to the driving wheels of the vehicle in one of several conventional ways. The illustrated embodiment depicts a four-wheel-drive (FWD) application in which the output shaft 20 is connected to a transfer case 21 that is also coupled to a rear drive shaft R and a front drive shaft F. Typically, the transfer case 21 is manually shiftable to selectively establish one of several drive conditions, including various combinations of two-wheel-drive and four-wheel drive, and high or low speed range, with a neutral condition occurring intermediate the two and four wheel drive conditions.

The transmission 14 has three inter-connected planetary gearsets, designated generally by the reference numerals 23, 24 and 25. The input shaft 18 continuously drives a sun gear 28 of gearset 23, selectively drives the sun gears 30, 32 of gearsets 24, 25 via clutch C1, and selectively drives the carrier 34 of gearset 24 via clutch C2. The ring gears 36, 38, 40 of gearsets 23, 24, 25 are selectively connected to ground 42 via clutches C3, C4 and C5, respectively.

As diagramed in FIG. 2, the state of the clutches C1–C5 (i.e., engaged or disengaged) can be controlled to provide six forward speed ratios (1, 2, 3, 4, 5), a reverse speed ratio (R) or a neutral condition (N). For example, the first forward speed ratio is achieved by engaging clutches C1 and C5. Shifting from one forward speed ratio to another is generally achieved by disengaging one clutch (referred to as the off-going clutch) while engaging another clutch (referred to as the on-coming clutch). For example the transmission 14 is shifted from first to second by disengaging clutch C5 while engaging clutch C4.

The torque converter clutch 19 and the transmission clutches C1–C5 are controlled by an electro-hydraulic control system, generally designated by the reference numeral 44. The hydraulic portions of the control system 44 include a pump 46 which draws hydraulic fluid from a reservoir 48, a pressure regulator 50 which returns a portion of the pump output to reservoir 48 to develop a regulated pressure in line 52, a secondary pressure regulator valve 54, a manual valve 56 manipulated by the driver of the vehicle and a number of solenoid operated fluid control valves 58–64.

The electronic portion of the control is primarily embodied in the transmission control unit 66, which is microprocessor-based, and conventional in architecture. The transmission control unit 66 controls the solenoid operated fluid control valves 58–64 based on a number of inputs to achieve a desired transmission speed ratio. Such inputs include, for example, signals representing the transmission input speed TIS, a driver torque command TQ, the transmission output speed TOS, and the hydraulic fluid temperature Tsump. Sensors for developing such signals may be conventional in nature, and have been omitted for simplicity.

The control lever 82 of manual valve 56 is coupled to a sensor and display module 84 that produces a diagnostic signal on line 86 based on the control lever position; such signal is conventionally referred to as a PRNDL signal, since it indicates which of the transmission ranges (P, R, N, D or L) has been selected by the vehicle driver. Finally, the fluid control valves 60 are provided with pressure switches 74, 76, 78 for supplying diagnostic signals to control unit 66 on lines 80 based on the respective relay valve positions. The control unit 66, in turn, monitors the various diagnostic signals for the purpose of electrically verifying proper operation of the controlled elements.

The solenoid operated fluid control valves 58–64 are generally characterized as being either of the on/off or modulated type. To reduce cost, the electro-hydraulic control system 44 is configured to minimize the number of modulated fluid control valves, as modulated valves are generally more expensive to implement. To this end, a set of three on/off relay valves, shown in FIG. 1 as a consolidated block 60, are utilized in concert with manual valve 56 to enable controlled engagement and disengagement of each of the clutches C1–C5 with only two modulated valves 62, 64. For any selected ratio, the control unit 66 activates a particular combination of relay valves 60 for coupling one of the modulated valves 62, 64 to the on-coming clutch, and the other modulated valve 62, 64 to the off-going clutch.

The modulated valves 62, 64 each comprise a conventional pressure regulator valve biased by a variable pilot pressure that is developed by current controlled force motor. The fluid controlled valve 58 is also a modulated valve, and controls the fluid supply path to converter clutch 19 in lines 70, 72 for selectively engaging and disengaging the converter clutch 19. The transmission control unit 66 determines pressure commands for smoothly engaging the on-coming clutch while smoothly disengaging the off-going clutch to shift from one speed ratio to another, develops corresponding force motor current commands, and then supplies current to the respective force motors in accordance with the current commands.

As indicated above, each shift from one speed ratio to another includes a fill or preparation phase during which an apply chamber of the on-coming clutch is filled in preparation for torque transmission. Fluid supplied to the apply chamber compresses an internal return spring, and once filled, strokes a piston to contact the clutch plates, developing torque capacity beyond the initial return spring pressure. Thereafter, the clutch transmits torque in relation to the clutch pressure, and the shift can be completed using various control strategies.

The usual control strategy involves commanding a maximum on-coming clutch pressure for an empirically determined fill time, and then proceeding with the subsequent phases of the shift. See, for example, the aforementioned U.S. Pat. Nos. 4,707,789 and 5,216,606, which patents are incorporated herein by reference. These patents recognize that the fill time for a given shift can change depending on various factors, resulting in poor shift quality. If the predetermined fill time is too short, the on-coming clutch does not have sufficient torque capacity when the off-going clutch is released, resulting in engine flare prior to the next phase of the shift; if the predetermined fill time is too long, the on-coming clutch will develop significant torque capacity before the off-going clutch is released, resulting in what is known as a tie-up condition. Accordingly, various strategies, including adaptive controls, have been developed to bring the predetermined fill times in closer alignment with the actual fill times.

The present invention is directed to a different and improved control strategy in which the fill phase is divided into first and second portions based on an estimate of the volume of fluid supplied to the on-coming clutch apply chamber. In the first portion of the fill phase, fluid is supplied to the apply chamber at a first elevated pressure (referred to herein as the fill pressure) while the control unit 66 uses a hydraulic flow rate model to continuously update the fluid volume estimate. In the second portion of the fill phase, initiated when the remaining un-filled volume of the apply chamber reaches a reference volume, the supply pressure is reduced to a second pressure (referred to herein as the trim pressure) at which the next phase of the shift is to be carried out. When the chamber volume is filled, the torque capacity of the on-coming clutch rises to a level corresponding to the trim pressure, and the next phase of the shift automatically ensues.

Figure 3:
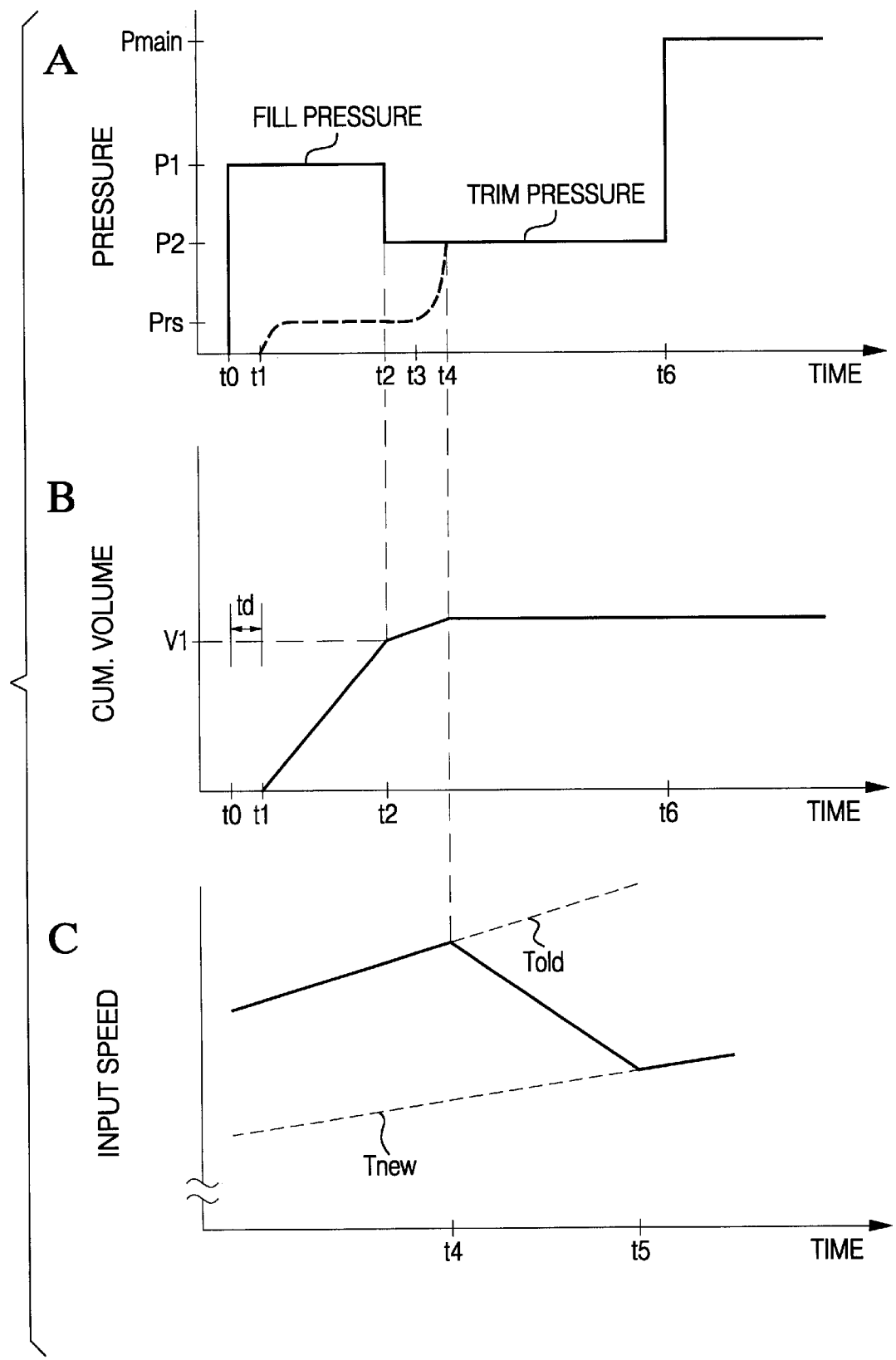
FIG. 3, Graphs A, B and C depict on-coming clutch engagement, volume estimation and input speed, respectively, for a power-on upshift, according to this invention.

FIG. 3, Graphs A, B and C, illustrate the above described control in the context of a power-on upshift. Graph A depicts the pressure command for the on-coming clutch (solid trace) and actual on-coming clutch pressure (broken trace), Graph B depicts the cumulative volume of hydraulic fluid supplied to the apply chamber of the on-coming clutch, and Graph C depicts the speed of the transmission input shaft. The interval t0–t4 defines the fill phase, and the shift is completed in the ensuing interval t4–t6. Referring to Graph A, the fill phase is initiated at time to by commanding the fill pressure P1 for the on-coming clutch. The fill pressure P1 may be selected based on various considerations, depending on how quickly the apply chamber is to be filled. Significantly, however, the fill pressure P1 is scheduled low enough to ensure that there is a known and predictable relationship between the commanded fill pressure and actual fluid flow. If the fill pressure is sufficiently high (at the main regulated control pressure Pmain, for example), the supply of fluid to the apply chamber tends to be flow restricted, significantly altering the relationship between the commanded fill pressure and the actual fluid flow. After a short delay td (defined by the interval t0–t1) due to the combined delays of the electrical and hydraulic portions of the system 44, hydraulic fluid begins to accumulate in the apply chamber, as indicated by the broken actual pressure trace in Graph A and the increase in cumulative fluid volume in Graph B. However, the actual clutch pressure remains at a low level Prs dictated by an internal return spring during such interval. When the cumulative fluid volume supplied to the apply chamber reaches a threshold volume V1 at time t2, the commanded pressure is reduced to a trim pressure having an initial value of P2, as indicated by the solid trace in Graph A and the reduced slope of the cumulative volume trace in Graph B. The trim pressure is the desired pressure for the next phase (or phases) of the shift, and may be adjusted over time depending on the particular control strategy utilized. In FIG. 3, the trim pressure is controlled during the interval t2–t6, whereafter the on-coming pressure is increased to the main control pressure Pmain. At time t3, the clutch piston begins to compress the clutch plates, and the clutch pressure quickly rises the commanded level in the interval t3–t4. At such point, the on-coming clutch has sufficient capacity to initiate the inertia phase of the shift, during which the transmission input shaft 18 decelerates from a trajectory Told dictated by the old or current speed ratio to a trajectory Tnew dictated by the new speed ratio. At time t5, the speed change is complete, and at time t6, the on-coming pressure is increased to the main control pressure Pmain as mentioned above. Thus, in this illustration, the first portion of the fill phase according to this invention occupies the interval t0–t2, and the second portion occupies the interval t2–t4.

Figure 4:
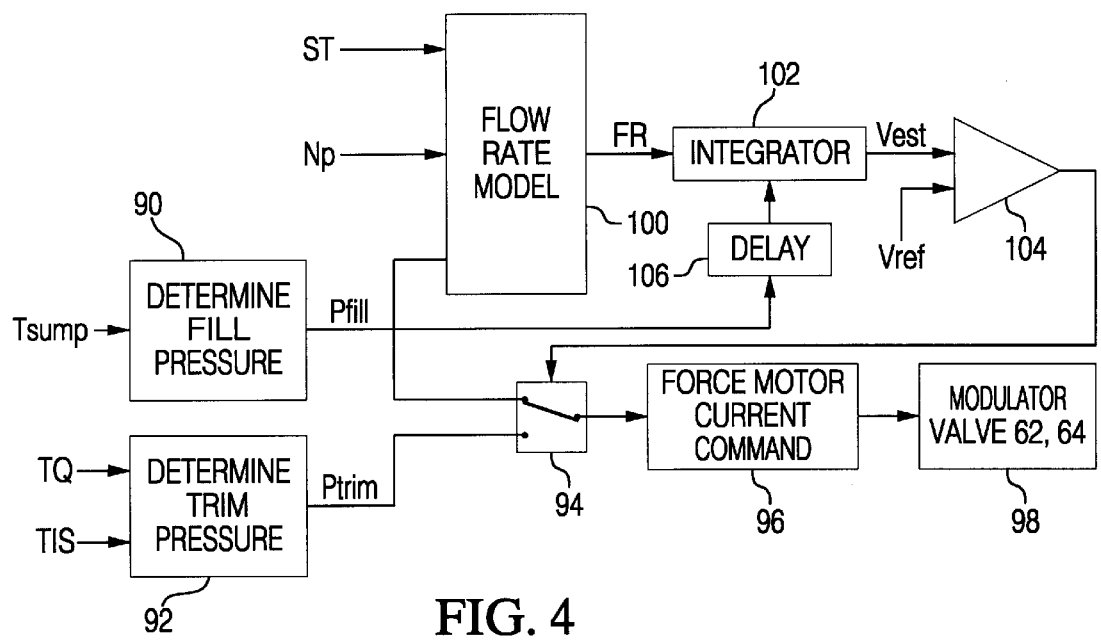
FIG. 4 is a block diagram illustrating the control of this invention as carried out by the control unit of FIG. 1.
Figure 5:
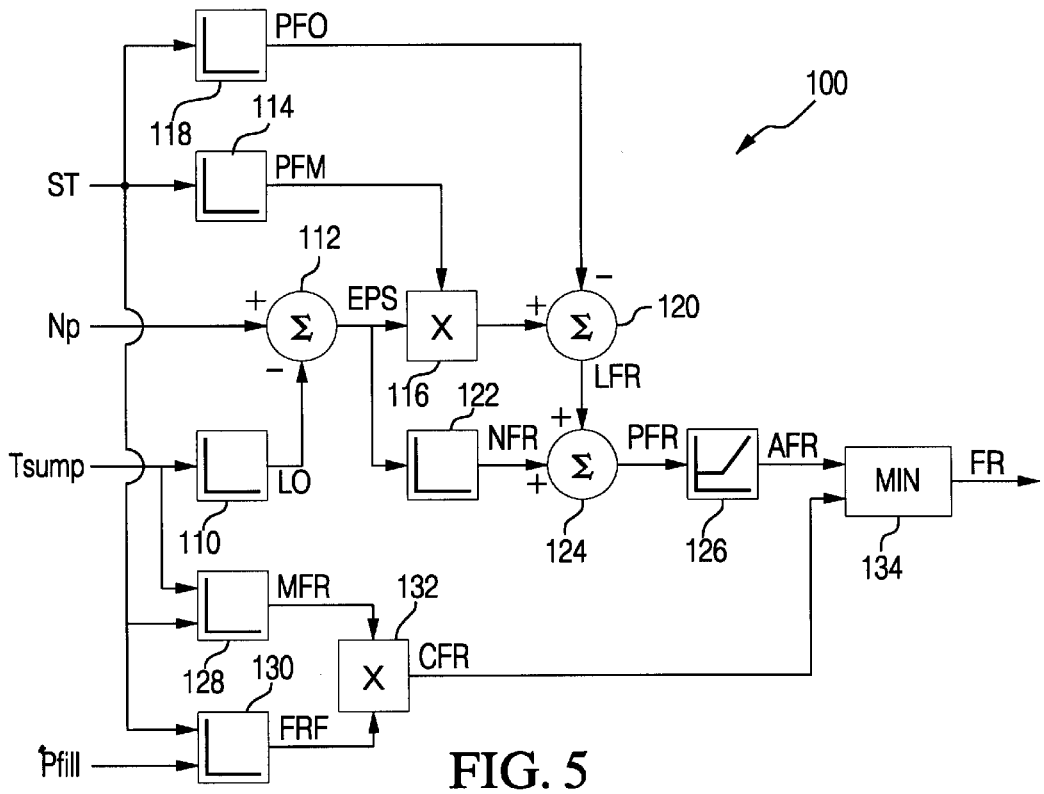
FIG. 5 is a block diagram detailing the flow rate model block of FIG. 4.

FIG. 4 and 5 illustrate, in block diagram form, a control as described above in reference to the graphs of FIG. 3. FIG. 4 depicts the overall shift control, whereas FIG. 5 depicts the flow rate model of FIG. 4 in more detail. Referring to FIG. 4, the blocks 90 and 92 respectively determine on-coming clutch pressure commands Pfill and Ptrim for the fill and subsequent phases of the shift. As indicated at block 90, the fill pressure Pfill may be determined as a function of the transmission fluid temperature Tsump. In general, a high value of Pfill causes the on-coming clutch apply chamber to be filled more quickly, enabling faster shift initiation. As noted above in reference to FIG. 3, however, the fill pressure Pfill is limited to ensure that there is a known and predictable relationship between Pfill and the actual fluid flow. As indicated at block 92, the trim pressure Ptrim may be determined as a function of driver torque demand TQ and transmission input speed TIS, and typically varies during the shift as required to satisfy a particular control objective; see, for example, the above-mentioned U.S. Pat. Nos. 4,707,789 and 5,216,606, which are incorporated herein by reference. Both Pfill and Ptrim are applied as inputs to a switch 94, which selects one of such inputs for application to the blocks 96 and 98. The block 96 converts the selected pressure command to a force motor current command, and block 98 represents the modulator valve 62, 64 that is coupled to the on-coming clutch. The operation of switch 94 is controlled by the blocks 100–106, which estimate the volume of fluid supplied to the apply chamber of the on-coming clutch, relative to a reference volume Vref. The switch is controlled to select Pfill until the estimated volume (Vest) reaches Vref, whereafter the switch is controlled to select Ptrim.

The block 100 represents a hydraulic flow model of the fluid supply paths for the various clutches C1–C5. The model inputs include the fill pressure Pfill, the shift type ST (for example, a 1–2 upshift), the speed Np of pump 46, and the temperature Tsump of the hydraulic fluid. The output of the model is the on-coming clutch flow rate FR. The flow rate FR is integrated by integrator block 102 to form the estimated cumulative volume Vest. The comparator block 104 compares Vest to the reference volume Vref, and controls the switch 94 as described in the preceding paragraph. The delay block 106 times a predetermined delay interval td beginning at the start of the fill phase, and holds the integrator 102 at zero during the timed interval; this accounts for the electro-hydraulic delay phenomenon described above in reference to Graph B of FIG. 3.

FIG. 5 depicts the flow rate model 100 in further detail. In general, the model 100 includes a first portion comprising the blocks 110–126 for estimating the maximum available pump flow rate AFR, a second portion comprising the blocks 128–132 for estimating the commanded flow rate CFR, and a minimum value (MIN) block 134 for setting the estimated flow rate FR equal to the lower of AFR and CFR.

The maximum available pump flow rate AFR is based on the shift type ST, the pump speed Np and the fluid temperature Tsump. The fluid temperature Tsump is applied to the table block 110, which characterizes the pump leakage in terms of a pump speed, referred to as a leakage offset LO. The summer 112 subtracts the leakage offset LO from the measured pump speed Np (which may be derived from the transmission input speed TIS) to form the effective pump speed EPS.

The pump flow rate PFR is characterized as a function of the effective pump speed EPS, including both linear and non-linear components. The linear component LFR is determined by the blocks 114–120, and the non-linear component NFR is determined by the block 122, with the two components being summed by the summer 124 to form pump flow rate PFR. The linear component LFR includes a proportionality or slope parameter (pump flow multiplier PFM) defined by the table block 114, and an offset parameter (pump flow offset PFO) defined by the table block 118, both PFM and PFO being stored as a function of shift type ST. The slope parameter PFM represents a flow rate per unit pump speed, and is multiplied by the effective pump speed EPS at multiplier 116. The offset parameter PFO represents a pump speed that occurs before any flow is available, and is subtracted from the output of multiplier 116 at summer 120 to form the linear flow rate component LFR. The non-linear flow rate component NFR is stored in table block 122 as a function of the effective pump speed EPS. Finally, the pump flow rate PFR is applied to a limit block 126 to form the maximum available flow rate AFR. The block 126 imposes a minimum value on AFR; this ensures that a positive flow rate is supplied to integrator 102 for stability purposes.

The commanded flow rate CFR is based on the shift type ST, the fluid temperature Tsump and the commanded fill pressure Pfill. The table block 128 outputs the maximum flow rate MFR for each type of shift if the maximum allowable fill pressure is commanded. This takes into account the valve and hydraulic passage geometries for each shift type ST, and the fluid temperature Tsump. The table block 130 provides a flow rate factor FRF which is applied to the maximum flow rate MFR by multiplier 132 to scale MFR based on the commanded fill pressure Pfill, yielding the commanded flow rate CFR. The factor FRF is also a function of the shift type ST so that the orifice characteristics of each type of shift can be taken into account.

As indicated above, the block 134 selects the minimum of the commanded flow rate CFR and the maximum available flow rate AFR in forming the estimated flow rate FR. If the commanded flow rate CFR is less than the maximum available flow rate AFR, the estimated flow rate FR is the commanded flow rate CFR; however, if the commanded flow rate CFR is greater than the maximum available flow rate AFR, the estimated flow rate FR is limited to the maximum available flow rate AFR. This addresses conditions where the pump speed Np is too low to produce the expected flow rate at the commanded fill pressure.

In summary, the control of this invention provides an improved fill control by modeling the flow rate supplied to the on-coming clutch based on a number of parameters including shift type, pump speed, fluid temperature and the commanded pressure, integrating the modeled flow rate to accurately determine the volume of fluid supplied to the apply chamber of the clutch, and then adjusting the commanded pressure based on the determined fluid volume. While described in reference to the illustrated embodiment, it will be understood that various modifications in addition to those mentioned above will occur to those skilled in the art. By way of example, the various tables described in reference to FIG. 5 may be implemented with empirically or mathematically determined data, or may be implemented in real time with a mathematical model. Thus, it will be understood that controls incorporating these and other modifications may fall within the scope of this invention, which is defined by the appended claims.

What is claimed is:

1. A control method for an automatic transmission including an on-coming clutch having an apply chamber that is filled with hydraulic fluid in a preparation phase of shifting, a pump for providing hydraulic fluid at a regulated pressure, and a controller for supplying hydraulic fluid at a commanded pressure to the on-coming clutch during the preparation phase, the method comprising the steps of:

setting the commanded pressure to a determined fill pressure at an onset of the preparation phase;

estimating a flow rate of the hydraulic fluid supplied to said on-coming clutch based on the determined fill pressure, a temperature of the fluid and a speed of the pump;

integrating the estimated flow rate during the preparation phase to determine a cumulative volume of fluid supplied to said on-coming clutch; and setting the commanded pressure to a determined post-fill pressure when the determined computed volume reaches a reference volume which is less than a volume of said apply chamber.

2. The control method of claim 1, wherein the step of integrating the estimated flow rate includes the steps of:

timing a delay interval from a start of said preparation phase, such delay interval corresponding to an electro-hydraulic delay of said transmission; and integrating the estimated flow rate upon expiration of said timed interval.

3. The control method of claim 1, wherein the step of estimating the flow rate of the hydraulic fluid supplied to said on-coming clutch includes the steps of:

estimating a maximum available flow rate to said on-coming clutch;

estimating a commanded flow rate to said on-coming clutch; and estimating the flow rate supplied to said on-coming clutch according to the lower of said maximum available flow rate and said commanded flow rate.

4. The control method of claim 3, wherein the step of determining the maximum available flow rate includes the steps of:

determining an effective speed of said pump based on a measured speed of said pump, less an offset due to leakage;

estimating the maximum available flow rate as a function of the determined effective speed of said pump and predefined characteristics of said pump and said transmission.

5. The control method of claim 4, wherein said estimated maximum available flow rate includes a linear component based on the determined effective speed of said pump and the predefined characteristics of said pump and transmission, and a non-linear component based on the determined effective speed of said pump and the predefined characteristics of said pump.

6. The control method of claim 3, wherein the step of estimating a commanded flow rate to said on-coming clutch includes the steps of:

estimating an upper flow rate that would be achieved with the commanded pressure at a maximum value;

determining a scale factor based on the determined pressure; and estimating said commanded flow rate by applying said scale factor to said estimated upper flow rate.

* * * * *